May 9, 1961 H. K. KIENZLE 2,983,523

PICK-UP HITCH

Filed April 2, 1959 2 Sheets-Sheet 1

FIG. I

INVENTOR.
HAROLD K. KIENZLE

BY C. Parker & R. C. Johnson

ATTORNEYS

May 9, 1961 H. K. KIENZLE 2,983,523
PICK-UP HITCH
Filed April 2, 1959 2 Sheets-Sheet 2
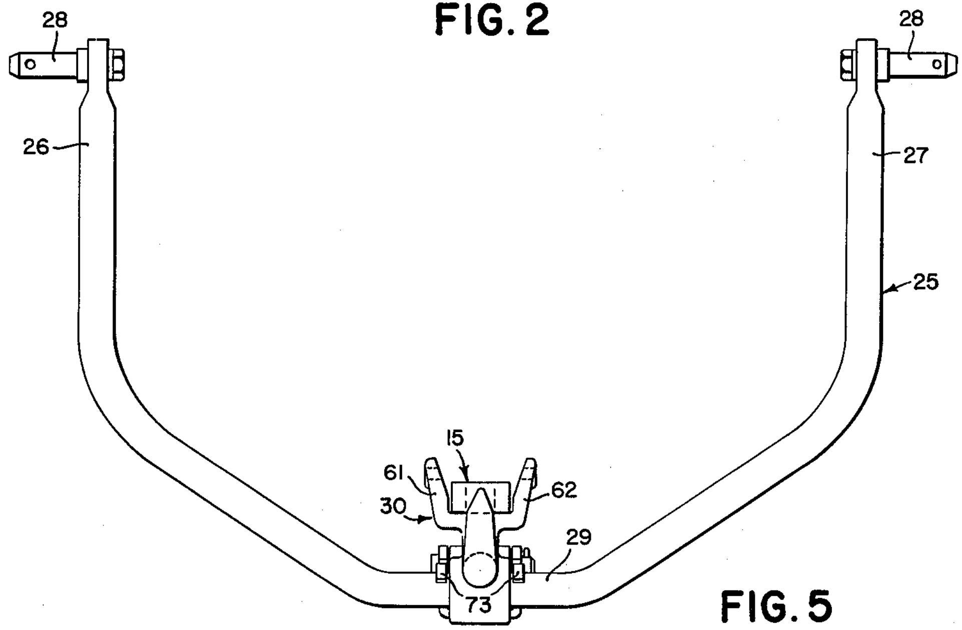
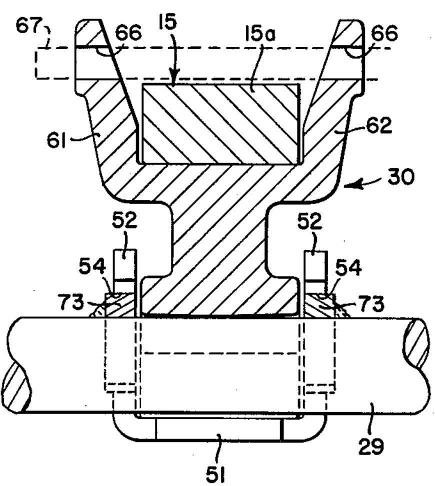
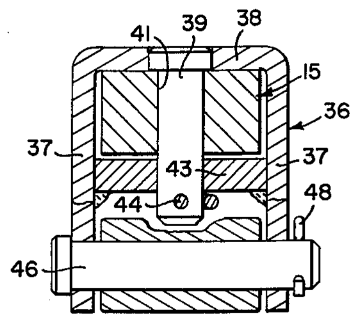
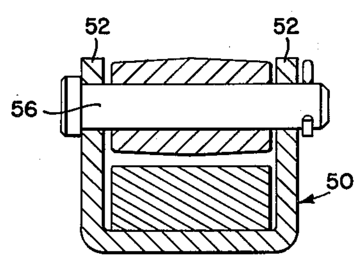
*INVENTOR.*
HAROLD K. KIENZLE
BY
C. F. Parker & R. C. Johnson
ATTORNEYS United States Patent Office 2,983,523

Patented May 9, 1961

1

2,983,523

PICK-UP HITCH

Harold K. Kienzle, Waterloo, Iowa, assignor to Deere & Company, Moline, Ill., a corporation of Delaware Filed Apr. 2, 1959, Ser. No. 803,638

10 Claims. (Cl. 280—479)

The present invention relates generally to agricultural implements and more particularly to hitch device for connecting an implement to a tractor to be propelled thereby.

The object and general nature of this invention is the provision of new and improved means to facilitate hitching an implement to a tractor without requiring that the operator leave the tractor seat. More specifically, it is a feature of this invention to provide hitch means so constructed and arranged that the hitch tongue or other draft receiving means at the front of the implement may be engaged by connection means controlled by the tractor power lift whereby to effect the hitch connection all that is necessary to do is to back the tractor into proper position relative to the implement and raise the implement connection means by operation of the tractor power lift mechanism. It is a further feature of this invention to provide means whereby the raising and lowering of the connection means automatically effects a latching and unlatching of the implement relative to the connection means.

Particularly, it is a feature of this invention to provide a pickup hitch that is so constructed and arranged as to automatically pick up the forward portion of the implement and latch it to the tractor without requiring the use of any extraneous latch-controlling means, such as cables, rods or the like extending to the operator's station on the tractor. A further feature of this invention is the provision of new and improved means for latching the implement to the tractor drawbar by the raising of the implement connection means into draft-transmitting relation with respect to the tractor drawbar, the implement being unlatched by the lowering of the implement connection away from the tractor drawbar. Still further, a feature of this invention is the provision of means whereby both the implement connecting part and the implement connection means may be latched or locked to the tractor drawbar, so that, during transport for example, inadvertent operation of the tractor power lift system will not result in accidental disconnection of the implement from the tractor.

These and other objects and advantages of the present invention will be apparent to those skilled in the art after a consideration of the following detailed description, taken in conjunction with the accompanying drawings, in which:

Fig. 1 is a side view, with certain parts in section, showing a hitch incorporating the principles of this invention, together with portions of the associated implement and tractor.

Fig. 2 is a fragmentary view taken generally along the line 2—2 of Fig. 1, showing the lift bail and other parts that are raised and lowered by operation of the tractor power lift mechanism.

Figure 3A:
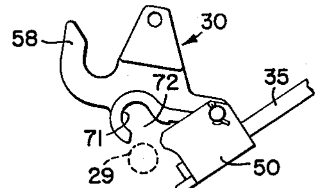
Figure 3:
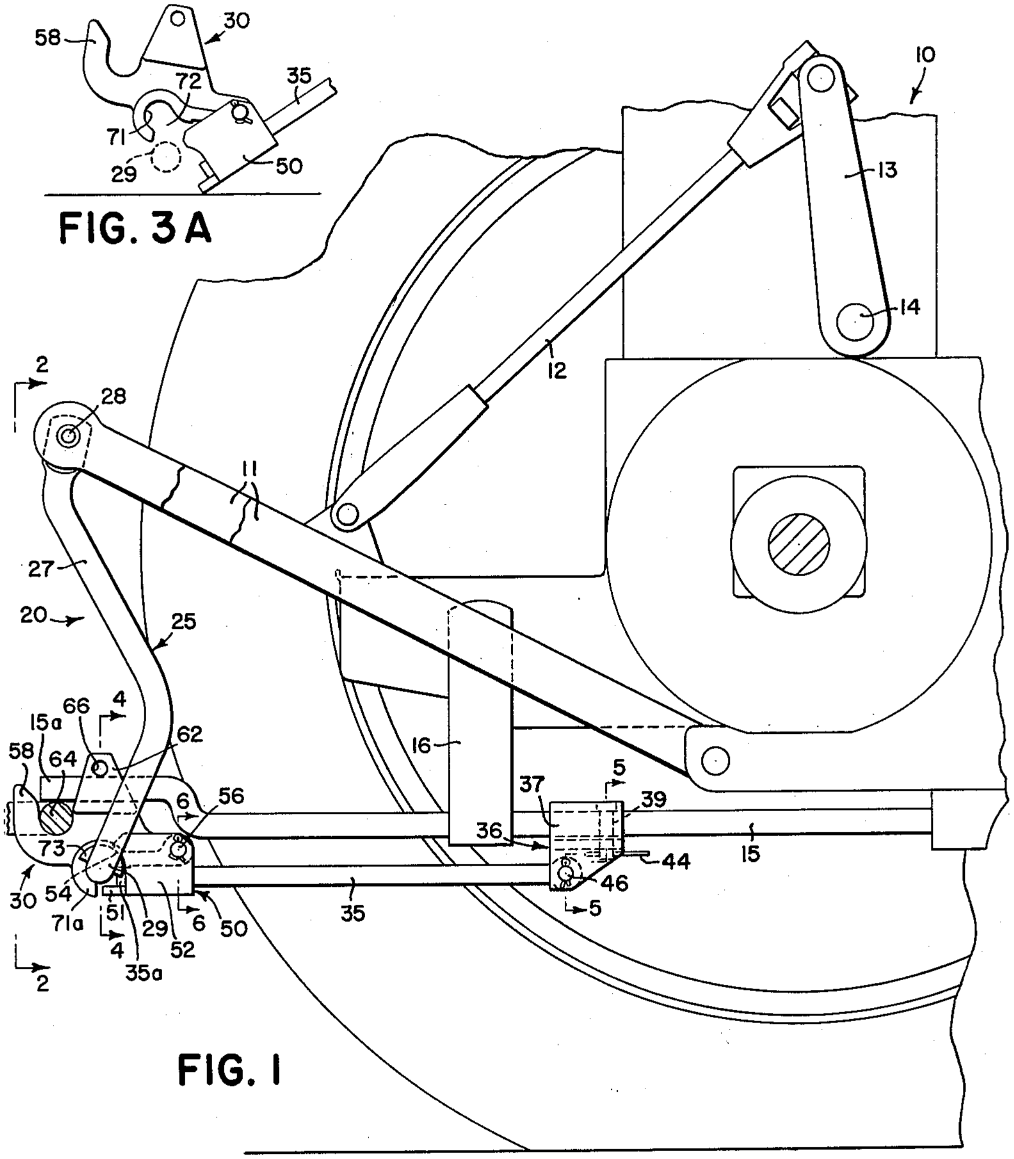

Figs. 3 and 3*a* are fragmentary views showing the manner of initially connecting the lift bail with the implement-receiving connection member.

Fig. 4 is an enlarged section taken along the line 4—4 of Fig. 1.

Fig. 5 is an enlarged section taken along the line 5—5 of Fig. 1.

Fig. 6 is an enlarged section taken along the line 6—6 of Fig. 1.

Referring first to Fig. 1, the hitch device of the present invention is shown as incorporated in or mounted on a tractor indicated in its entirety by the reference numeral 10. The tractor, so far as the present invention is concerned, is generally conventional and embodies a pair of generally vertically and laterally swingable draft links 11 connected at their forward ends for universal movement relative to the tractor. The draft links 11 are connected through lift links 12 with a pair of lift arms 13 connected to a rockshaft 14. The latter forms a part of hydraulic power lift mechanism carried by and forming a part of the tractor 10. The tractor also includes a generally fore-and-aft extending drawbar 15 connected at its forward end with the tractor to receive draft power therefrom and also connected rearwardly thereof with a drawbar support 16 with respect to which the drawbar 15 may be held against lateral swinging whenever desired, as when, for example, the tractor incorporates the hitch device of this invention.

According to my invention, I provide a hitch device, indicated in its entirety by the reference numeral 20, that is adapted to pick up the pole or draft tongue or other hitch part of trailing implements, for example, that are adapted to be hitched to the tractor 10. The hitch device of this invention permits the operator to connect and disconnect the trailing implement whenever desired without requiring that the operator leave his station on the tractor. Further, this invention contemplates the provision of a hitch device in which the associated implement is connected securely to the tractor without the use of any manually or separately controllable latches that generally require some operating means that extends to or adjacent the operator's station on the tractor.

The hitch device 20 includes a lift member in the form of a vertically disposed U-shaped bail 25 having upper end portions 26 and 27 carrying laterally outwardly extending apertured studs 28 so constructed and arranged as to be swingably received in the rear ends of the tractor draft links 11. The lift member or bail 25 has at its lower portion a transverse section in the form of a central portion or bight section 25 that is indicated at 29 and is adapted to be releasably connected with implement connection means, indicated in its entirety by the reference numeral 30, which will be described below in detail.

According to this invention, the hitch device 20 includes a draft-transmitting bar 35 that is adapted to be pivotally connected to the tractor drawbar 15 at a point well in front of the rear portion thereof, as by attaching bracket means. This means includes a U-shaped member 36 adapted to embrace the tractor drawbar 15 and having side sections 37 extending downwardly below the drawbar 15 and a center section 38 that is apertured to receive a hitch pin 39 that extends downwardly through an opening 41 in the drawbar 15. The member 36 also includes a crosspiece 43 that lies at the underside of the drawbar 15 and is also apertured to receive the pin 39. The latter is releasably held in bracket-locking position by a hairpin retainer 44. The side sections 37 of the member 36 extend downwardly and are apertured to receive a pivot pin 46 that pivotally connects the front end of the bar 35 with the member 36, the pin 46 being releasably held by a cotter 48 or the like.

The implement connection member 30 is formed with a generally vertical implement-receiving hook 58, and forwardly of the hook, the member 30 carries a pair of upwardly diverging sections 61 and 62 that normally lie on opposite sides of the rear end portion of the tractor drawbar 15, as best shown in Figs. 2 and 4. Between the sections 61 and 62 and the hook section 58 the member 30 has a socket section 63 in which the ring 64 of an implement draft pole, or other hitch point tongue, is received. From Fig. 1, it will be seen that the parts are so arranged that when the member 30 is drawn up against the rear end of the tractor drawbar 15, the rear end portion 15*a* of the tractor drawbar overlies the socket 63 and cooperates with the latter to retain the implement hitch ring 64 in connected relation with the part 30. The opposite diverging sections 61 and 62 are apertured, as at 66, to receive a pin 67 that releasably holds the implement connection means 30 connected with the tractor drawbar 15 so that the parts cannot inadvertently become disconnected.

The implement connection member 30 also forms the principal portion of means that releasably connects the lower portion of the bail 25 with the rear end of the draft-transmitting bar 35, so that, when the retaining pin 67 is removed, the raising and lowering of the tractor draft links 11 acts to raise and lower the draft-transmitting bar 35, swinging the latter about its pivotal connection 46 with the tractor drawbar 15.

For purposes of releasably pivoting the lower or central portion 29 of the bail 25 to the rear end of the draft-transmitting bar 35, the implement connection member 30 is formed with a generally forwardly facing arcuate bail-receiving socket 71 (Fig. 3*a*). The throat or opening providing for access to the socket 71 is indicated at 72 and is so dimensioned that, as when bringing the bail 25 into position before the pins 28 are connected to the draft links 11, when the draft-transmitting bar 35 is in a position resting at its lower end on the ground (Fig. 3) and the member 30 swung away from the rear end of the bar 35, there is sufficient space to bring the central portion 29 of the bail 25 up into position in the socket 71, as illustrated in Figs. 3 and 3*a*. Also, the central section 29 of the bail 25 carries a pair of laterally spaced apart arcuate abutments 73 fixed, as by welding, to the lower center section 29 of the bail 25 in laterally spaced apart relation, the spacing being such that the abutments 73 are adapted to lie at opposite sides of the front end portion 35*a* (Fig. 1) of the bar 35.

Thus, the abutments or lugs 73, when the bail 25 is swung upwardly to a vertical position for the purpose of connecting the pivot studs 28 with the rear ends of the draft links 11, cooperate with the bar 35 to prevent lateral displacement of the latter relative to the bail. The lugs 73 also have other functions. In addition to preventing laterally displacement of the bail 25 relative to the bar 35 the lugs 73, embracing upper portions of the socket 71, also serve to prevent lateral displacement of the implement connection member 30 relative to the draft bar 35, and, more importantly, the lugs 73 have a third function. When the bail 25 is swung from its inserting position (Fig. 3) upwardly to a vertical position (Fig. 1) the front portions of the lugs or abutments 73 swing underneath the abutment sections 54 of the side members 52 of the member 50. Thus, when the bail 25 is in its vertical position, it is so connected with the rear end of the draft-transmitting bar 35 that when the bail 25 is raised and lowered the bar 35 and the implement connection member 30 are also raised and lowered relative to the tractor drawbar 15.

By the mechanism just described, it is a simple matter to connect an implement to the drawbar of the tractor, and thus securely connect the implement in draft-transmitting relation with the tractor without requiring that the operator dismount from his seat on the tractor.

The operation of the mechanism so far described is substantially as follows:

Assuming, first, that the tractor is not equipped with the hitch mechanism of the present invention, the draft-transmitting bar 35 is first connected to the tractor drawbar 15 by mounting the bracket 36 thereon and then connecting the bar 35 to the bracket 36 through the pin 46. If the draft-transmitting bar 35 does not already have the implement connection member 30 attached thereto the latter is pivotally connected with the member 50 through the pivot pin 56. The bail member 25 is first brought into the position shown in Figs. 3 and 3*a*, in which the center section 29 can be inserted into the socket section 71 of the member 30 with the lugs 73 on opposite sides of the socket section 71. The member 30 is then swung downwardly to enclose the central portion 29 of the bail 25 and bring the lugs 73 into a position to engage underneath the abutments 54 (Fig. 1). As soon as the bail 25 is swung upwardly to a vertical position, the tractor power lift mechanism may then be actuated to lower the draft links 11 to permit the application to the studs 28 of the bail 25, after which the usual retaining pins are inserted to apertures in the outer ends of the studs 28. The pin 67 is not at this time carried by the member 30.

In order to connect the tractor to the implement the draft links 11 are raised slightly to lift the rear end of the bar 35 off the ground, and then, with the member 30 in a lower position, the tractor is backed up to the implement so as to dispose the hook section 58 underneath the ring 64 of the implement. Then by raising the draft links 11 the bail 25 will be raised and that in turn will raise the member 30 to engage the hook section 58 in the ring 64. Continued raising the draft links 11 will raise the member 30 to engage the hook section 58 in the ring 64. Continued raising of the draft links 11 will raise the member 30 and implement hitch ring 64 up to the end of the tractor drawbar 15, substantially to the position shown in Fig. 1, in which the rear end 15*a* of the tractor drawbar 15 cooperates with the hook section 58 to retain the implement ring 64 in position in the socket 63. The implement is thus connected to the tractor in draft-transmitting relation and the outfit may be operated as desired.

At any time that it is desired to disconnect the tractor and implement, all that is necessary to do is to operate the tractor power lift mechanism to lower the draft links 11, first taking out the pin 67 if it has been inserted in the openings 66, until the hook section 58 is disconnected from the ring 64. The tractor may then be driven away from the implement and used for other services, if desired. If such other services require the use of the draft links 11, the bail 25 may readily be disconnected, not only from the draft links 11 but also from the implement connection member 30 merely by first disconnecting the pivot studs 28 from the draft links 11 and then swinging the bail 25 downwardly and rearwardly to the point where the implement connection member 30 may be swung upwardly relative to the draft-transmitting bar 35 until the bail member 25 can be removed from the socket and thus disconnected from the tractor and from the bar 35. For the purpose of holding the latter so that it will not drag on the ground, the bar 35 and member 30 are raised up to substantially the position shown in Fig. 1 at which time the pin 67 may be inserted in the openings 66 in the diverging parts 51 and 52 so as to retain the draft-transmitting bar 35 in a position just underneath the tractor drawbar 15 and out of the way so that the draft-transmitting bar 35 will not contact the ground or interfere with the attachment of other implements to the tractor. As a matter of fact, the draft-transmitting bar 35 and the implement connection 30 may, without the bail 25, be used to connect trailing implements to the drawbar 35 by manually raising the member 30 and bar 35 into the position shown in Fig. 1, engaging the hook 58 with the hitch part of the trailing implement, and then inserting the retaining pin 67. This, of course, requires that the tractor operator dismount from the tractor.

The retaining pin 67 also has a function other than holding the bar 35 up against the tractor drawbar when the bail is removed. Assuming that the implement has been connected to the tractor in the manner first described, namely, by utilizing the bail 25 and the draft links to raise and lower the connection member 30 so as to effect a connection with the implement without dismounting from the tractor, when the implement is so connected, as shown in Fig. 1, the retaining pin 67 may be inserted through the openings 66 in the member 30 so as to retain the latter in the upper position, and thus prevent any inadvertent operation of the tractor power lift mechanism from accidently disengaging the implement from the tractor drawbar. If, for example, the implement were being transported along a road or highway and the tractor power lift mechanism inadvertently lowered, the implement might become disconnected from the tractor, causing damage to the implement and possible injury to persons nearby. This possibility applies mainly to such implements as trailers or trailing implements and the like that may be required to be transported along the highway at transport speed.

While I have shown and described above the preferred structure in which the principles of this invention have been incorporated, it is to be understood that my invention is not to be limited to the particular details, shown and described above, but that, in fact, widely different means may be employed in the practice of the broader aspects of my invention.

What I claim therefore, and desire to secure by Letters Patent is:

1. A pick-up hitch for tractors having a central fore and aft extending drawbar, a pair of generally vertically swingable draft links disposed generally at opposite sides of said drawbar, and controllable means to raise and lower said draft links, said hitch comprising a generally U-shaped bail, means at the end portions of said bail to receive the rear ends of said draft links, whereby raising and lowering the latter serves to raise and lower said bail, a draft-transmitting bar adapted to be pivotally connected at its forward end to said tractor drawbar, an implement-engaging connection member pivotally connected with the rear portion of said draft-transmitting bar, bail-receiving means on said draft-transmitting bar, means on said pivoted implement-engaging connection to hold said bail in engagement with said draft-transmitting bar, and means on said implement-engaging connection to releasably lock the latter to said tractor drawbar.

2. A pick-up hitch for tractors having a central fore and aft extending drawbar, a pair of generally vertically swingable draft links disposed generally at opposite sides of said drawbar, and controllable means to raise and lower said draft links, said hitch comprising a generally U-shaped bail, means at the end portions of said bail to receive the rear ends of said draft links, whereby raising and lowering the latter serves to raise and lower said bail, a draft-transmitting bar adapted to be pivotally connected at its forward end to said tractor drawbar, an implement-connecting member pivotally connected with the rear portion of said draft-transmitting bar, said member having a bail-receiving socket constructed and arranged to releasably receive said bail means and adapted to be closed against said bar to hold said bail member in said socket, means on said bail member and bar to lock the bail member and said implement-connecting member to said bar, whereby raising and lowering of said bail member serves to raise and lower said implement-connecting member, and means to releasably lock said bar and implement-connecting member to said tractor drawbar.

3. The invention set forth in claim 2, further characterized by said bail member locking means comprising a pair of lugs fixed to said bail member in spaced apart relation so as to span portions of said pivoted implement-connecting member and abutment means on said draft-transmitting bar located so as to overlie said lugs when the bail member is connected with said tractor draft links.

4. An implement pick-up hitch of the detachable type adapted for use with a tractor having a central fore-and-aft extending drawbar and a pair of power-lifted pivoted draft links, said hitch comprising a draft transmitting bar adapted to be releasably and swingably connected with the tractor drawbar, an implement connecting means pivotally connected with the rear portion of said bar, a lift member connectible at its upper portion with the rear ends of said draft links and having a transverse section at its lower portion, and means on said implement connecting means and said bar shaped to close about said transverse section for releasably connecting said lift member with said draft transmitting bar.

5. The invention set forth in claim 4, further characterized by means on said implement connection means to engage the rear portion of said tractor drawbar, and means on said transverse section engageable with implement connection means whereby lateral displacement of said lift member and said bar is prevented.

6. The invention set forth in claim 4, further characterized by said lift member, when unattached to said draft links, being swingable generally vertically about the transverse axis of said transverse section relative to said bar and said implement connection means, and means on said transverse section and on said bar adapted to interlock when said lift member is swung upwardly so as to hold said lift member interconnected with said draft transmitting member.

7. The invention set forth in claim 4, further characterized by said pivoted implement connecting means having a socket adapted to receive the transverse section of said lift member in an approximately horizontal position when said connecting means is swung away from said bar, said implement connecting means being swingable toward bar with said transverse section disposed in said socket, and means carried by said lift member to interconnect with said bar when said lift member is swung about the axis of said socket into a generally vertical position.

8. A pick-up hitch for tractors having a pair of generally vertically swingable laterally spaced apart draft links pivotally connected at their forward portions with the tractor, and controllable means to raise and lower said draft links, said hitch comprising a generally U-shaped bail, means at the end portions of said bail to receive the rear ends of said draft links, whereby raising and lowering the latter serves to raise and lower said bail, a draft-transmitting bar adapted to be pivotally connected at its forward end with the tractor, an implement-engaging connection member pivotally connected with the rear portion of said draft-transmitting bar, bail-receiving means on said draft-transmitting bar, means on said pivoted implement-engaging connection to hold said bail in engagement with said draft-transmitting bar, and means on said implement-engaging connection to releasably hold said implement-engaging connection in an upper position relative to the tractor.

9. A pick-up hitch as defined in claim 8, further characterized by means on said pivoted implement-engaging connection and said draft-transmitting bar whereby said bail in one position thereof in said bail-receiving means holds said implement-engaging connection locked to said draft-transmitting bar.

10. An implement pick-up hitch of the detachable type adapted for use with a tractor having a pair of power-lifted pivoted draft links, said hitch comprising a draft transmitting bar adapted to be releasably and swingably connected with the tractor, an implement connecting means pivotally connected with the rear portion of said bar, a lift member connectible at its upper portion with the rear ends of said draft links and having a transverse section at its lower portion, and means on said implement connecting means and said bar shaped to close about said transverse section for releasably connecting said lift member with said draft transmitting bar.

References Cited in the file of this patent

UNITED STATES PATENTS

| | | |
|---|---|---|
| 2,791,444 | McNeice | May 7, 1957 |
| 2,803,358 | Elfes | Aug. 20, 1957 |
| 2,805,083 | Sherwen | Sept. 3, 1957 |